US009297661B2

(12) United States Patent
Gepner et al.

(10) Patent No.: US 9,297,661 B2
(45) Date of Patent: Mar. 29, 2016

(54) AVIATION WATCH (71) Applicant: Garmin Switzerland GmbH, Schaffhausen (CH)

(72) Inventors: Joseph E. Gepner, Bonner Springs, KS (US); Thomas I. Loschen, Olathe, KS (US); Matthew C. Burch, Lawrence, KS (US)

(73) Assignee: Garmin Switzerland GmbH (CH)

( * ) Notice: Subject to any disclaimer, the term of this patent is extended or adjusted under 35 U.S.C. 154(b) by 51 days.

(21) Appl. No.: 14/319,418

(22) Filed: Jun. 30, 2014

(65) Prior Publication Data

US 2015/0094951 A1 Apr. 2, 2015

Related U.S. Application Data (60) Provisional application No. 61/883,574, filed on Sep. 27, 2013.

(51) Int. Cl.
*G01C 21/20* (2006.01)
*G04G 9/00* (2006.01)
*G04G 21/04* (2013.01)
*G01C 21/36* (2006.01)
*G01S 19/15* (2010.01)
*G04G 21/02* (2010.01)
*G01S 19/34* (2010.01)

(52) U.S. Cl.
CPC ............ *G01C 21/20* (2013.01); *G01C 21/3632* (2013.01); *G01S 19/15* (2013.01); *G04G 9/0064* (2013.01); *G04G 21/02* (2013.01); *G04G 21/04* (2013.01); *G01S 19/34* (2013.01)

(58) Field of Classification Search
CPC ...... G01C 21/20; G01S 19/13; G04G 9/0064; G04G 21/04

USPC .......................................................... 701/467
See application file for complete search history.

(56) References Cited

U.S. PATENT DOCUMENTS

| 6,057,786 | A | * | 5/2000 | Briffe | ...................... G01C 23/00 340/974 |
| 6,119,055 | A | * | 9/2000 | Richman | .............. G08G 5/0013 244/114 R |
| 6,405,107 | B1 | * | 6/2002 | Derman | ............... G01C 23/005 340/3.5 |

OTHER PUBLICATIONS

Garmin fēnix™ Owner's Manual, published prior to Sep. 27, 2013.
Garmin G3X™ Pilot's Guide, published prior to Sep. 27, 2013.
Garmin G3X™ Screen Capture, showing bearing to nearest airport, published prior to Sep. 27, 2013.

* cited by examiner

*Primary Examiner* — Richard Camby
(74) *Attorney, Agent, or Firm* — Samuel M. Korte; Maxwell M. Ali (57) ABSTRACT A wearable electronic device utilizes indicators on a display screen, such as tick marks positioned around the perimeter of the display, to point to the bearing of a desired location such as a nearest airport when GPS is enabled. The electronic device may be implemented as an aviation watch that comprises a display device having a screen including a plurality of indicators arranged proximal to a perimeter of the screen. The aviation watch determines a direction of an airport that is nearest in proximity to the location of the aviation watch and activates a subset of the plurality of indicators of the screen, the subset of the plurality of indicators providing a directional bearing to the airport determined to be nearest in proximity to the location of the aviation watch.

18 Claims, 7 Drawing Sheets

AVIATION WATCH

CROSS-REFERENCE TO RELATED APPLICATIONS

The present application claims the benefit of 35 U.S.C. §119(e) of U.S. Provisional Application Ser. No. 61/883,574, filed Sep. 27, 2013, and titled "AVIATION WATCH," which is herein incorporated by reference in its entirety.

BACKGROUND

Because of their relatively small size and compact form, global positioning system (GPS) enabled mobile electronic devices offer several practical advantages with respect to providing navigation and navigation-related content and positional data to a user. For example, watches that provide various position and navigation functionality to wearers are often used for running, hiking, biking, and other sporting activities.

SUMMARY

Techniques are described to furnish functionality to a GPS-enabled mobile electronic device configured to be worn by a user (hereinafter, a "wearable electronic device") to utilize indicators on a display screen, such as tick marks positioned around the perimeter of the display, to point to the bearing of a desired location such as a nearest airport when GPS is enabled. In one or more implementations, the wearable electronic device may be implemented as an aviation watch that comprises a display device having a screen including a plurality of indicators arranged proximal to a perimeter of the screen; a global positioning system (GPS) receiver operable to receive one or more signals associated with a location of the aviation watch; a memory operable to store one or more modules; and a processor. The processor is operable to execute the one or more modules to determine a direction of an airport that is nearest in proximity to the location of the aviation watch and activate a subset of the plurality of indicators of the screen, the subset of the plurality of indicators providing a directional bearing to the airport determined to be nearest in proximity to the location of the aviation watch. In embodiments, other waypoints or airports may be selected for directional guidance using the indicators.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. The use of the same reference numbers in different instances in the description and the figures can indicate similar or identical items.

DETAILED DESCRIPTION

Overview

The present disclosure describes techniques, which may be implemented in a GPS-enabled wearable electronic device, that employ patterns of indicators positioned proximal to a perimeter of a display screen of a wearable electronic device for providing information to a user. "Proximal to the perimeter of the display screen", as used herein, means closer to the perimeter of the display screen than to the center of the display. For example, the wearable electronic device can include a plurality of indicators (such as tick marks) arranged about a perimeter (e.g., a circumference) of the display screen, whereby an illumination or activation pattern of the indicators provides information to the user. In such configurations, the indicators may be spaced from the center of the display by around 80-100% of the total distance between the center of the display and the perimeter of the display.

In one or more implementations, the wearable electronic device may be implemented as an aviation watch that comprises a display device having a screen including a plurality of indicators arranged proximal to a perimeter of the display screen. The aviation watch acquires the locations of airfields (e.g., airports), waypoints, navaids, and/or other points of interest (POIs) near to the aviation watch, determines the airport location (or other waypoint) that is nearest in proximity to the wearable electronic device, and activates a subset of the plurality of indicators of the display screen. In embodiments, the subset of the plurality of indicators provides a directional bearing to the nearest airport (or other waypoint).

Such a configuration enables a user (e.g., a pilot, copilot, or other member of a flight crew) to quickly ascertain the direction to the nearest airport relative to the aircraft with minimum pilot workload. Accordingly, the user can maneuver the aircraft such that the indicators point up on the screen (e.g., point to a top or a twelve o'clock position), whereby the user and aircraft will then be traveling toward the nearest airport.

In the following discussion, an example wearable electronic device environment is first described. Example procedures are then described that can be employed with the example environment, as well as with other environments and devices without departing from the spirit and scope thereof. Example display screens of the wearable electronic device are then described that can be employed in the illustrated environment, as well as in other environments without departing from the spirit and scope thereof.

Example Environment

Figure 1:
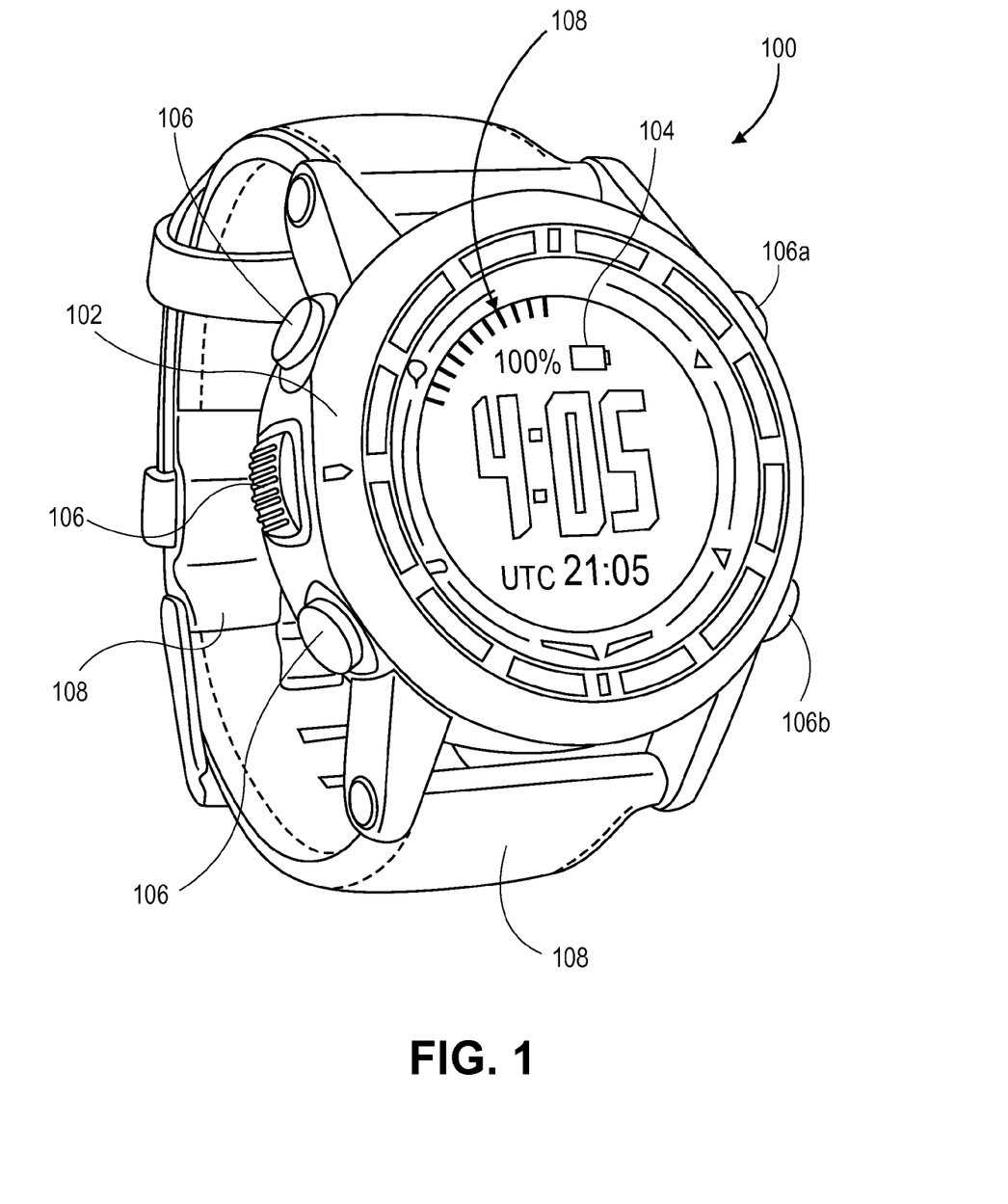
FIG. 1 is an illustration of an example environment in which techniques may be implemented in a wearable electronic device, such as an aviation watch, to furnish an illumination or activation pattern of indicators to provide directional information to a user of the device.

FIG. 1 illustrates an example wearable electronic device 100 that is operable to perform the techniques discussed herein. In FIG. 1, a perspective view of a wearable electronic device 100 is shown in accordance with one or more embodiments of the present disclosure. The wearable electronic device 100 is operable to provide timekeeping, flight and/or navigation functionality to a user of the device 100.

The wearable electronic device 100 may be configured in a variety of ways. In implementations, the wearable electronic device 100 includes apparatus permitting the device to be worn by a user of the device. For example, in one embodiment, the wearable electronic device 100 can include a wristband permitting the device to be worn about the wrist of a user. For example, a wearable electronic device 100 may be implemented as a GPS-enabled aviation watch, which may be configured as a wristwatch having a wristband that may be worn about the wrist of a user. However, it is contemplated that wearable electronic devices 100 may be worn in other ways. For example, a wearable electronic device 100 may include a chain or necklace permitting the wearable electronic device to be worn about the neck of the user, a belt permitting the wearable electronic device to be worn about the torso of the user, a helmet or headset mounted display (HMD), wearable goggles or glasses, and so forth. Moreover, it is contemplated that the techniques of the present disclosure may be implemented in any GPS-enabled mobile electronic device that includes navigation and/or flight information functionality. Thus, in embodiments, the techniques disclosed herein may be implemented in a mobile electronic device configured as a portable navigation device (PND), a mobile phone, a hand-held portable computer, a tablet computer, a personal digital assistant, a multimedia device, a media player, a game device, combinations thereof, and so forth. In the following description, a referenced component, such as wearable electronic device 100, may refer to one or more entities, and therefore by convention reference may be made to a single entity (e.g., the wearable electronic device 100) or multiple entities (e.g., the wearable electronic devices 100, the plurality of wearable electronic devices 100, and so on) using the same reference number.

The wearable electronic device 100 includes a housing 102. The housing 102 is configured to house (e.g., substantially enclose) various components of the wearable electronic device 100. The housing 102 may be formed from a lightweight and impact-resistant material, such as plastic, nylon, or combinations thereof, for example. However, in embodiments, the housing 102 may also be formed from a conductive material, such as metal, or a semi-conductive material. The housing 102 may be formed from a non-conductive material, such as a non-metal material, for example. The housing 102 may include one or more gaskets (e.g., a seal) to permit the housing 102 to become substantially waterproof or water resistant. The housing 102 may include a location for a battery and/or another power source for powering one or more components of the wearable electronic device 100. The housing 102 may be a singular piece or may include a plurality of sections.

As shown in FIG. 1, the wearable electronic device 100 includes a display 104. The display 104 may include one or more of a liquid crystal display (LCD), a thin film transistor (TFT), a light-emitting diode (LED), a light-emitting polymer (LEP), a polymer light-emitting diode (PLED), and so forth. In one or more implementations, the display 104 is configured to display text and/or graphical information. The display 104 may be backlit such that it may be viewed in the dark or other low-light environments. In an implementation, the display 104 is a 100 pixel by 64 pixel film compensated super-twisted nematic display (FSTN) including a light-emitting diode (LED) backlight. In some configurations, the backlight may generate orange and/or red light to limit interference with the user's natural night vision and/or night vision imaging system (NVIS) equipment.

The display 104 may include a transparent lens that covers and/or protects components of the wearable electronic device 100. The display 104 may be provided with a touch screen to receive input (e.g., data, commands, etc.) from a user. For example, a user may operate the wearable electronic device 100 by touching the touch screen and/or by performing gestures on the screen. In some embodiments, the touch screen may be a capacitive touch screen, a resistive touch screen, an infrared touch screen, combinations thereof, and so forth. In implementations, the wearable electronic device 100 includes one or more user input devices (e.g., a keypad, buttons, a wireless input device, a thumbwheel input device, a track stick input device, and so forth). The user input devices may include one or more audio I/O devices, such as a microphone, one or more speakers, and so forth.

The wearable electronic device 100 may also include a communication module representative of communication functionality to permit the wearable electronic device 100 to send/receive data between different devices (e.g., components, peripherals, and so forth) and/or over one or more networks. The communication module may be representative of a variety of communication components and functionality including, but not limited to: one or more antennas; a browser; a transmitter, receiver, and/or transceiver; a wireless radio; one or more data ports; one or more software interfaces and drivers; one or more networking interfaces; one or more data processing components; and so forth. The wearable electronic device 100 may be configured to communicate via one or more networks with a cellular provider and an Internet provider to receive mobile phone service and various content, respectively. Content may represent a variety of different content, examples of which include, but are not limited to: map data, which may include route information; web pages; services; music; photographs; video; email service; instant messaging; device drivers; real-time and/or historical weather data; instruction updates; and so forth.

The one or more networks are representative of a variety of different communication pathways and network connections which may be employed, individually or in combinations, to communicate among various components. Thus, the one or more networks may be representative of communication pathways achieved using a single network or multiple networks. Further, the one or more networks are representative of a variety of different types of networks and connections that are contemplated including, but not limited to: the Internet; an intranet; a satellite network; a cellular network; a mobile data network; wired and/or wireless connections; and so forth. Examples of wireless networks include, but are not limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through universal serial bus (USB), Ethernet, serial connections, and so forth.

In embodiments, the user input device includes a control button 106. As illustrated in FIG. 1, the control button 106 is associated with, e.g., adjacent, the housing 102. While FIG. 1 illustrates five control buttons 106 associated with the housing 102, other implementations provide different configurations. For example, the wearable electronic device 100 may include fewer than five control buttons 106, such as one, two, three, or four control buttons 106. Additionally, the wearable electronic device 100 may include more than five control buttons 106, such as six, seven, or eight for example. The control button 106 is configured to control a function of the wearable electronic device 100. For example, the various control buttons 106, and/or other elements of the user input devices, may be used to select between operating modes of the device 100, as described below. In embodiments, user input may be provided from movement of the housing 102. For example, an accelerometer may be used to identify tap inputs on the housing 102 or upward and/or sideways movements of the housing 102. In embodiments, user input may be provided from touch inputs identified using various touch sensing technologies, such as resistive touch, capacitive touch interfaces, and so forth.

Further, the control buttons 106 and/or other user input devices may be used to switch between various mode pages. As provided in FIG. 2, functions of the wearable electronic device 100 may be associated with a location determining component 142 and/or a performance monitoring component 144. Functions of the wearable electronic device 100 may include, but are not limited to, providing timekeeping functionality by displaying on the display 104 a current time (e.g., indicators 108 positioned around the circumference or perimeter of the display 104 can indicate chronological seconds), displaying on the display 104 a directional bearing to the nearest airport (such as through illumination of one or more indicators 108), displaying a current geographic location of the wearable electronic device 100, mapping a location on the display 104, locating a desired location and displaying the desired location on the display 104, monitoring a user's heart rate, monitoring a user's speed, monitoring a distance traveled, calculating calories burned, and the like. The user input devices, such as one or more of the control buttons 106, may be used to switch between, activate, control, configure, and otherwise use these various functions.

In some configurations, control button 106a may be configured as a "direct to" shortcut input. Depressing button 106a launches a waypoint entry screen where a user may utilize one or more of the buttons 106 and/or other user input devices to input a waypoint, such as an airport identifier, GPS waypoint, navaid, combinations thereof, and the like. Upon entry and selection of the inputted waypoint, the device 100 may provide navigational functionality regarding the selected waypoint. For example, indicators 108 may indicate the direction to the inputted waypoint and navigational informational, such as distance, ETA, ETE, and other metrics and mode information, may be provided regarding the inputted waypoint. In some implementations, button 106a may function as an "up" input when depressed momentarily and function as the "direct to" shortcut when depressed for longer periods of time.

In some configurations, control button 106b may be configured as a "nearest" shortcut input. Depressing button 106b launches a nearest airport list that lists nearby airports based on geographic distance from the current geographic location of the device 100. Upon entry and selection of one of the displayed airports, the device 100 may provide navigational functionality regarding the selected airport. For example, indicators 108 may indicate the direction to the selected airport and navigational informational, such as distance, ETA, ETE, and other metrics and mode information, may be provided regarding the selected airport. Such functionality may be useful, for example, to enable the user of the device 100 to rapidly locate nearby airports in flight without having to access several menu pages and inputs. In some implementations, button 106b may function as a "down" input when depressed momentarily and function as the "nearest" shortcut when depressed for longer periods of time.

In various configurations, the indicators 108 may be configured as tick marks positioned around the perimeter of the display. In other configurations, a single indicator 108 may be provided that is configured to be presented near or around the perimeter of the display. For instance, the indicator 108 may be configured as a pointer or arrow head that indicates time (seconds, minutes, hours, etc.) in timekeeping mode and which provide directional bearing functionality (described below) in navigation mode. Thus, the one or more indicators 108 indicate chronological information (e.g., seconds) in timekeeping mode and navigation information (bearing, etc.) in navigation mode.

In embodiments, the one or more indicators 108 can be illuminated to provide a representation of various information depending on the mode of the wearable electronic device 100. For example, in a navigation mode the one or more indicators 108 can provide a directional bearing to the nearest airport (or other waypoint), whereas in a timekeeping mode the indicators 108 can indicate chronological seconds. In an implementation, the display 104 includes sixty (60) indicators 108 positioned around the circumference or perimeter of the display 104, where each indicator 108 provides representation of a chronological second to emulate the seconds' hand of a conventional analog watch.

In accordance with one or more implementations of the present disclosure, the wearable electronic device 100 may be implemented as a GPS-enabled aviation watch, which may be configured as a wristwatch having a wristband 110 that may be worn about the wrist of a user to secure the aviation watch to the wrist of the user. As illustrated in FIG. 1, the wristband 110 is associated with, e.g., coupled to, the housing 102. For example, the wristband 110 may be removably secured to the housing 102 via attachment of securing elements to corresponding connecting elements. Examples of securing elements and/or connecting elements include, but are not limited to pins, hooks, latches, clamps, snaps, and the like. The wristband 110 may be made of a lightweight and resilient thermoplastic elastomer, leather, metal, a fabric, combinations thereof, and so forth. In embodiments, the wristband 110 may encircle a portion of the wrist of a user without discomfort while securing the housing 102 to the user's wrist. The wristband 110 may also be configured as a strap to attach the housing to various portions of a user's body, such as a user's leg, forearm, and/or upper arm, fixtures within the aircraft, and so forth.

Figure 2:
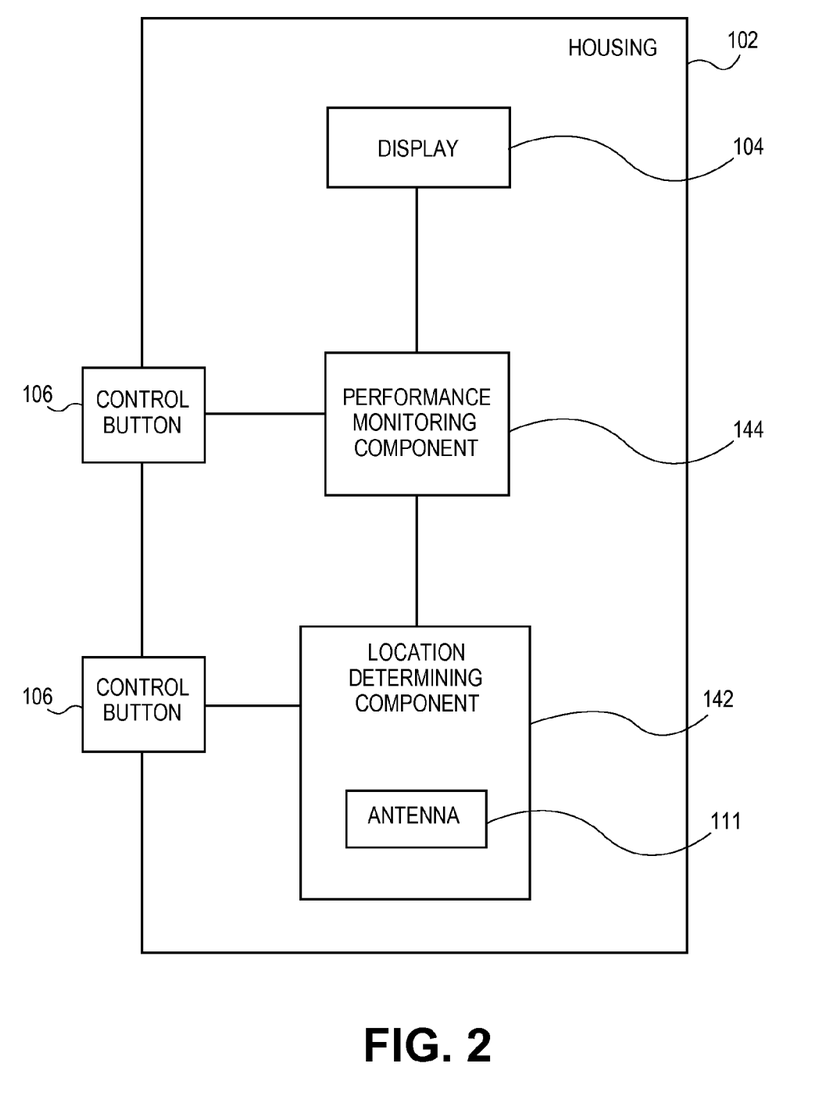
FIG. 2 is an example schematic diagram of the wearable electronic device of FIG. 1.

Referring to FIG. 2, a wearable electronic device 100, such as an aviation watch, is illustrated in accordance with one or more embodiments of the present disclosure. The housing 102 can include a location determining component 142 positioned within the housing. For example, the location determining component 142 may include an antenna 111 having a ground plane. The ground plane may be formed by coupling a printed circuit board and/or a conductive cage with the antenna 111. The antenna 111 and the ground plane may be coupled using solder, connection elements, or combinations thereof.

In one or more implementations, the location determining component 142 is a GPS receiver that is configured to provide geographic location information of the watch. Generally, GPS is a satellite-based radio navigation system capable of determining continuous position, velocity, time, and direction information. The location determining component 142 may additionally or alternatively be configured to utilize other global navigation satellite systems (GNSS) such as the GALILEO, GLONASS, and BEIDOU systems. Further, the location determining component 142 may be configured to utilize terrestrial position systems to determine device position, such as radio navigation aids (VOR), cellular network triangulation, Wi-Fi network triangular, combinations thereof, and the like.

Location determining component 142 may be configured to provide a variety of other location determining functionality. Location determining functionality, for purposes of discussion herein, may relate to a variety of different navigation techniques and other techniques that may be supported by "knowing" one or more positions. For instance, location determining functionality may be employed to provide position/location information, timing information, speed information, and a variety of other navigation-related data. Accordingly, the location determining component 142 may be configured in a variety of ways to perform a wide variety of functions. For example, the location determining component 142 may be configured for outdoor navigation, vehicle navigation, aerial navigation (e.g., for aircraft), marine navigation, personal use (e.g., as a part of fitness-related equipment), and so forth. Accordingly, the location determining component 142 may include a variety of devices to determine position using one or more of the techniques previously described.

The location determining component 142, for instance, may use signal data received via a GPS receiver in combination with map data that is stored in a memory of the wearable electronic device 100 to provide various functionalities, such as determining the location of the nearest airport and displaying a directional bearing on the display 104 indicating the direction to the determined nearest airport, generating navigation instructions (e.g., via navigational points, vectors and guidance information to a waypoint, etc.), show a current position on a map, and so on. Location determining component 142 may include one or more antennas 111 to receive signal data as well as to perform other communications, such as communication via one or more networks. The location determining component 142 may also provide other positioning functionality, such as to determine a heading, latitude, longitude, an average speed, calculate an arrival time, and so forth.

The location determining component 142 may include one or more processors, controllers, and/or other computing devices as well as a memory, e.g., for storing information accessed and/or generated by the processors or other computing devices. The processor may be electrically coupled with a printed circuit board and operable to process position determining signals received by the antenna 111. The location determining component 142, e.g., via the antenna 111, is configured to receive position determining signals, such as GPS signals from GPS satellites, to determine a current geographic location of the watch. The location determining component 142 may be configured to calculate a route to a desired location, provide instructions, e.g., directions, to navigate to the desired location, display maps and other information on the display, and to execute other functions, such as, but not limited to, those functions described herein. In some configurations, the location determining component 142 includes a first processor configured to process received positioning signals and to determine device location. A second processor, discrete from the first processor, may be incorporated into the device 100 to provide other functionality, including the navigation, timekeeping, and guidance functionality described herein.

A memory, such as the memory of the location determining component 142, may store cartographic data and executable modules used by or generated by the location determining component 142. The memory may be integral with the location determining component 142, may be a stand-alone memory, or may be a combination of an integral and a stand-alone memory. The memory may include, for example, a removable nonvolatile memory card. The memory is an example of device-readable storage media that provides storage functionality to store various data associated with the operation of the wearable electronic device 100, such as a software program configured to implement the processes and modules described herein, or other data to instruct the processor and other elements of the wearable electronic device 100 to perform the techniques described herein. A wide variety of types and combinations of memory may be employed. The memory may include, for example, removable and non-removable memory elements such as RAM, ROM, Flash (e.g., SD Card, mini-SD card, micro-SD Card), magnetic, optical, USB memory devices, and so forth.

Antenna 111 may be any antenna capable of receiving wireless signals from a remote source, including directional antennas and omnidirectional antennas. In one or more implementations, the antenna 111 is configured to receive and/or transmit a signal, such as a GPS signal. Antenna 111 may include any type of antenna in which the length of the ground plane affects the efficiency of the antenna. In accordance with one or more implementations of the present disclosure, the antenna 111 is an omnidirectional antenna having a ground plane. An omnidirectional antenna may receive and/or transmit in both orthogonal polarizations, depending upon direction. In other words, omnidirectional antennas do not have a predominant direction of reception and/or transmission. Examples of omnidirectional antennas include, but are not limited to, inverted-F antennas (IFAs) and planar inverted-F antennas (PIFAs). In contrast to omnidirectional antennas, directional antennas have a primary lobe of reception and/or transmission over an approximate 70 by 70 degree sector in a direction away from the ground plane. Examples of directional antennas include, but are not limited to, microstrip antennas and patch antennas.

The antenna 111 may be embedded within the housing 102, external with respect to the housing 102, or a combination of embedded and external. In accordance with one or more implementations of the present disclosure, the antenna 111 is an embedded antenna. As used herein, an embedded antenna refers to an antenna that is positioned completely within a device housing. For example, antenna 111 may be positioned completely within housing 102. In some embodiments, antenna 111 may be an external antenna with all or a portion of the antenna 111 exposed from housing 102.

As discussed, the location determining component 142 includes the antenna 111. The antenna 111 may be associated with, e.g., formed on and/or within, an antenna support assembly. Antenna 111 may be positioned on a top portion or one or more side portions of the antenna support assembly.

As described herein, the location determining component 142 may include a printed circuit board electrically coupled to one or more processing components. The printed circuit board may support a number of processors, microprocessors, controllers, microcontrollers, programmable intelligent computers (PIC), field-programmable gate arrays (FPGA), other processing components, other field logic devices, application specific integrated circuits (ASIC), and/or a memory that is configured to access and/or store information that is received or generated by the watch. The wearable electronic device 100 may implement one or more software programs to control text and/or graphical information on the display, as discussed herein. In one or more implementations, the printed circuit board supports a bottom portion of the antenna support assembly. For example, the antenna support assembly and antenna 111 may be positioned in the center of the top surface, bottom surface, or to a side of the printed circuit board.

A processor may provide processing functionality for the wearable electronic device 100 and may include any number of processors, micro-controllers, or other processing systems, and resident or external memory for storing data and other information accessed or generated by the wearable electronic device 100. The processor may execute one or more software programs that implement the techniques and modules described herein. The processor is not limited by the materials from which it is formed or the processing mechanisms employed therein and, as such, may be implemented via semiconductor(s) and/or transistors (e.g., electronic integrated circuits (ICs)), and so forth. As described above, the processor may comprise a portion of the location determining component, may be discrete from the location determining component, or may be one of several processors utilized by the device 100.

Figure 3:
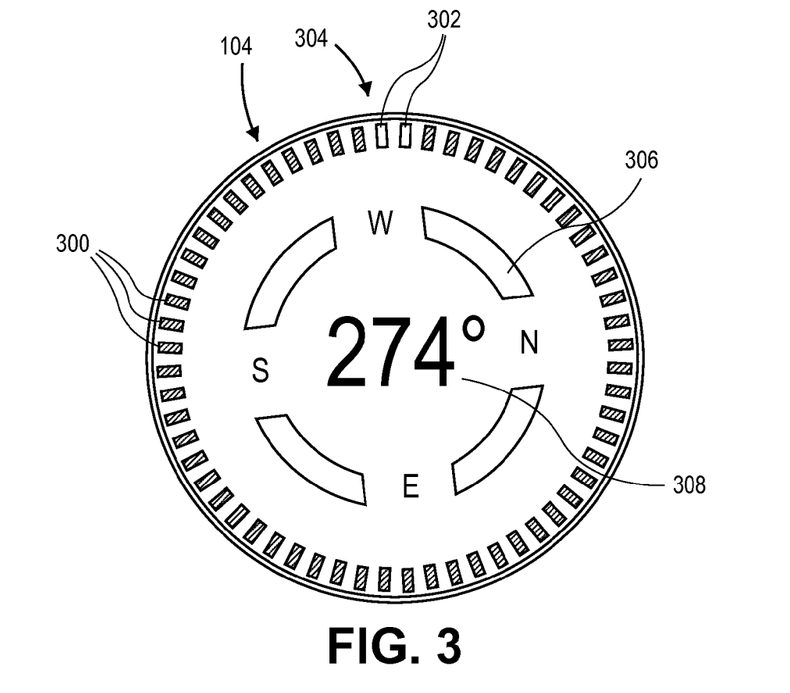
FIG. 3 is an example display of the wearable electronic device, showing activation of the indicators for directional information in accordance with an example implementation of the present disclosure.

In accordance with one or more embodiments of the present disclosure, functions of the wearable electronic device (e.g., an aviation watch) 100 may be associated with the location determining component 142 and/or the performance monitoring component 144. For example, the location determining component 142 is configured to receive signals, e.g. position determining signals, such as GPS signals, to determine a position of the watch as a function of the signals. In an implementation, the location determining component 142 is configured to compare the position of the wearable electronic device 100 relative to one or more airports. For example, the location determining component 142 can access location data of airports as a signal from a memory (e.g., a memory integral with the location determining component 142, separate from the location determining component 142, or a combination of integral with and separate from the location determining component 142), compare the location data of the airports with the current position of the wearable electronic device 100, and determine a directional bearing to the closest (e.g., nearest in proximity) airport. The wearable electronic device 100 can then provide an indication of the directional bearing on the display 104. For example, as shown in FIG. 3, the display 104 includes a plurality of indicators 300 positioned around the circumference or perimeter of the display. The display 104 is configured such that a subset of the plurality of indicators 300 can be activated independently of the other indicators. The wearable electronic device 100 can provide an indication of the directional bearing of the closest airport by illuminating or otherwise activating the subset of indicators. As illustrated in FIG. 3, a subset 302 of the plurality of indicators 300 is activated near the top position 304 or "twelve o'clock" position, which indicates that the user is oriented towards the closest airport. The display 104 may also provide a compass ring 306 and a direction of travel 308 of the user, which is provided in degrees in FIG. 3.

The indicators 300 can be activated/illuminated as pixels of a liquid crystal display (LCD), a thin film transistor (TFT), a light-emitting diode (LED), a light-emitting polymer (LEP), a polymer light-emitting diode (PLED), and so forth. In one or more implementations, the wearable electronic device 100 includes timekeeping functionality where the indicators 300 provide an indication of chronological seconds. The timekeeping functionality may include providing information such as time of day, stop watch, Zulu time, time zone information, and so forth.

The device 100 may be equipped with a database of airport locations including the name and location of various airports. Other information, such as information for each airport from its airport flight directory listing (e.g., runway dimensions and orientation, etc.), may also be included the database. The database may also include location information for other waypoints, such as non-directional beacons (NDB), VHF Omnidirectional (VOR) beacons, RNAV/GPS waypoints for approach, en route, and departure operations, user-specified locations such as user-entered destinations, waypoints, and flight plan information, combinations thereof, and the like.

Figure 4A:
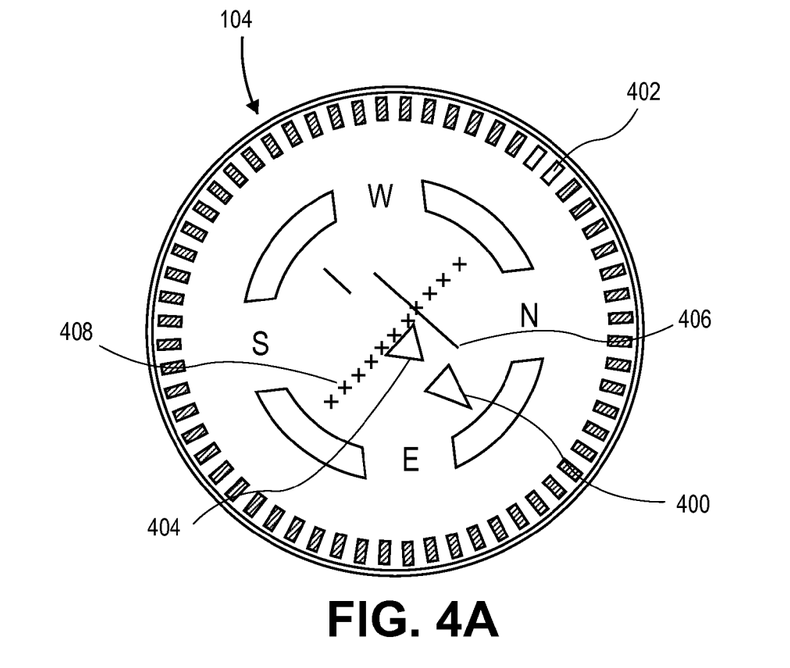
FIG. 4A is an example display of the wearable electronic device (e.g., an aviation watch), showing a horizontal situation indicator (HSI) page in accordance with an example implementation of the present disclosure.
Figure 4B:
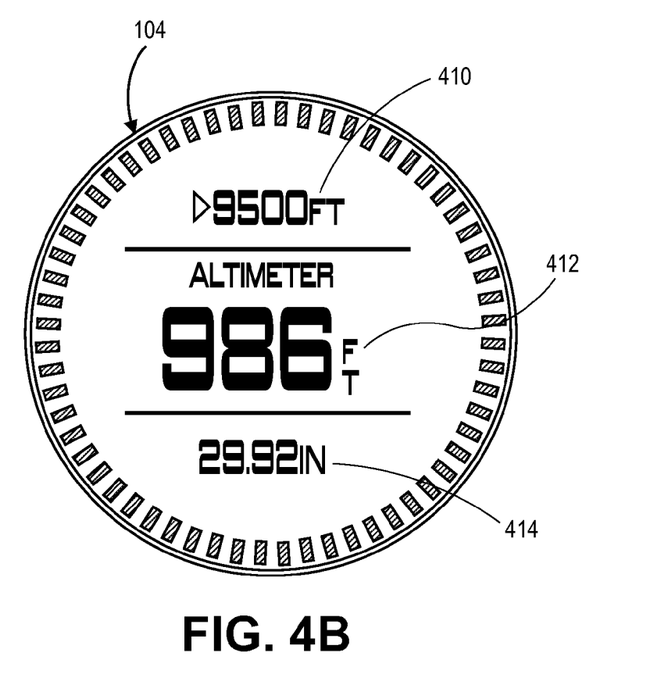
FIG. 4B is an example display of the wearable electronic device, showing altimeter information page in accordance with an example implementation of the present disclosure.
Figure 4C:
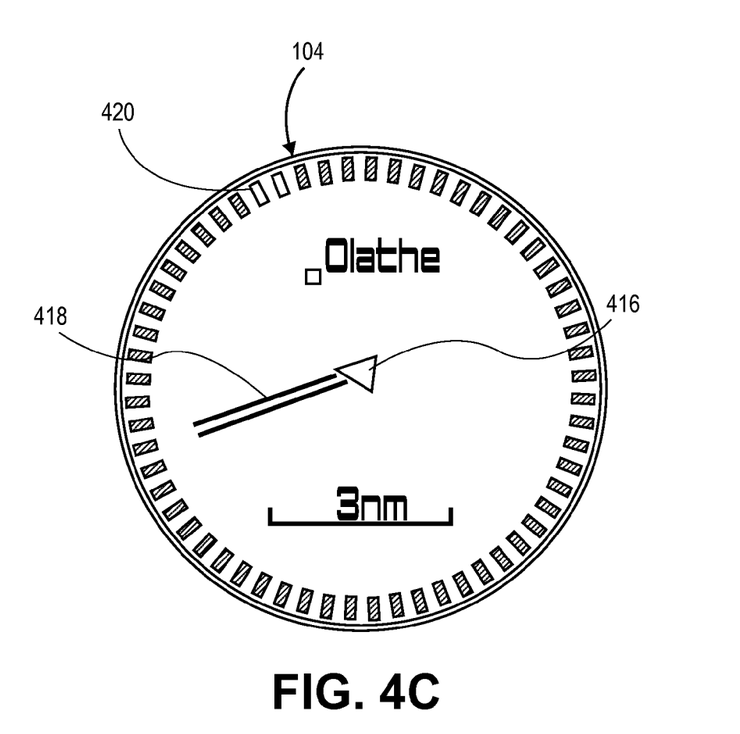
FIG. 4C is an example display of the wearable electronic device, showing a map page in accordance with an example implementation of the present disclosure.
Figure 4D:
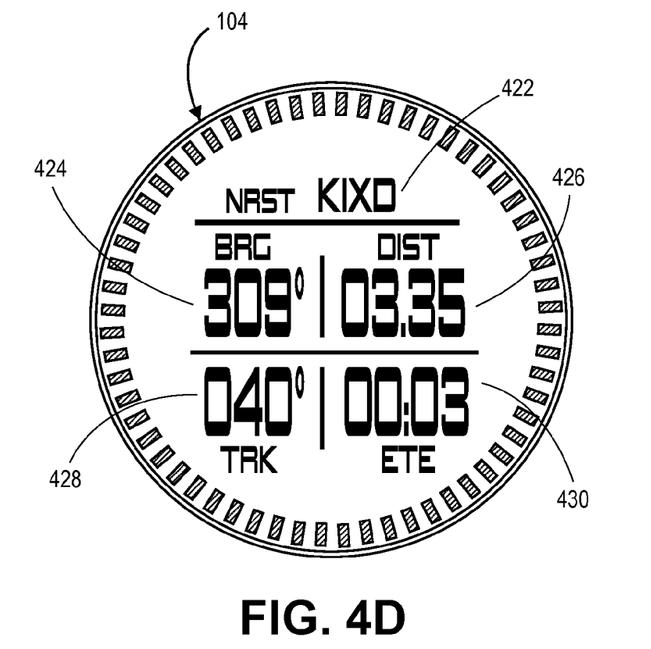
FIG. 4D is an example display of the wearable electronic device, showing relative positional information page in accordance with an example implementation of the present disclosure.
Figure 4E:
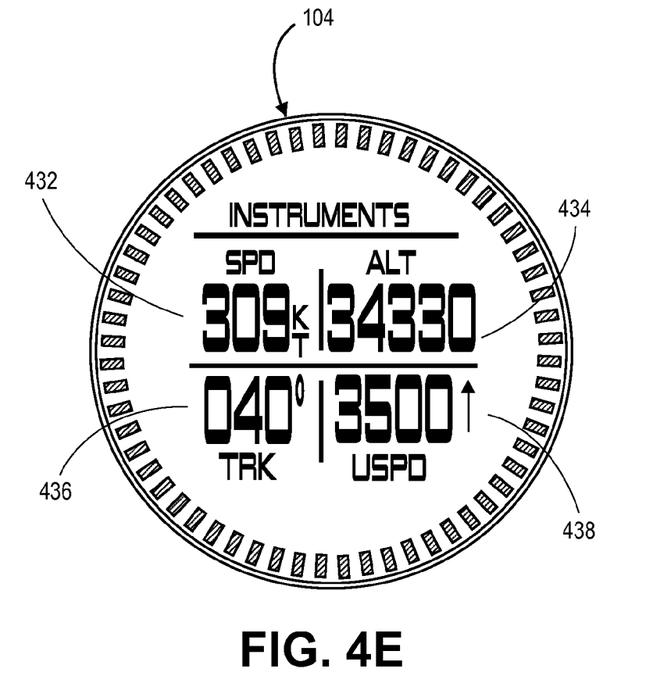
FIG. 4E is an example display of the wearable electronic device, showing an instruments page in accordance with an example implementation of the present disclosure.

The wearable electronic device 100 may be configured to provide various location-based information via the display 104. In one or more implementations, the location determining component 142 is configured to display course lines, bearings related to waypoints, a course deviation indicator (CDI), distance of deviation from a course, and so forth. For example, as shown in FIG. 4A, the display 104 provides a horizontal situation indicator (HSI) page that displays a course line pointer 400, a bearing to the next waypoint 402, a to-from indicator 404, a course deviation indicator (CDI) 406, and an indicator to show a distance of deviation 408. In embodiments, as shown in FIG. 4B, the display 104 provides an altimeter page display that includes indicia configured to furnish an alert altitude 410 (e.g., an altitude at which the wearable electronic device 100 will provide an audible or tactile alert), a pressure altitude 412, a barometric pressure 414, combinations thereof, and so forth. In embodiments, as shown in FIG. 4C, the display 104 provides a map page display that includes indicia furnishing an indication of current location and direction 416, a route to a next waypoint 418, and a bearing to a next waypoint 420. In embodiments, as shown in FIG. 4D, the display 104 provides a nearest airport page display, which can provide relative positional information. For example, the display 104 can include indicia furnishing an airport identifier 422 for the nearest airport, a bearing to the airport 424, a distance to the airport 426, a track over ground 428, an estimated time for arrival at the airport 430, combinations thereof, and so forth. In embodiments, as shown in FIG. 4E, the display 104 provides an instruments page display that includes indicia furnishing a ground speed 432, an altitude 434, a track over ground 436, a vertical speed 438 (e.g., as provided in feet per minute, or other units), combinations thereof, and so forth. In the example embodiments shown in FIGS. 3 through 4E, the plurality of indicators (e.g., indicators 108) can provide a visual indication of a bearing to a nearest airport regardless of the page presented by the device 100 and/or selected by the user. The user may depress button(s) 106 to select the desired page for display as well as to control the various functions and features provided by each page.

The location determining component 142 may also be configured to calculate a route to a desired location, provide instructions to navigate to the desired location, display maps and/or other information on the display 104, to execute other functions described herein, among other things. The performance monitoring component 144 may be positioned within the housing 102 and be coupled to the location determining component 142 and the display 104. The performance monitoring component 144 may receive information, including, but not limited to geographic location information, from the location determining component 142 to perform a function, such as monitoring performance and/or calculating performance values and/or information related to a watch user's movement. The monitoring of the performance and/or the calculating performance values may be based at least in part on the geographic location information. The performance values may include, for example, a user's heart rate, speed, a total distance traveled, total distance goals, speed goals, pace, cadence, and calories burned. These values and/or information may be presented on the display 104.

Figure 5:
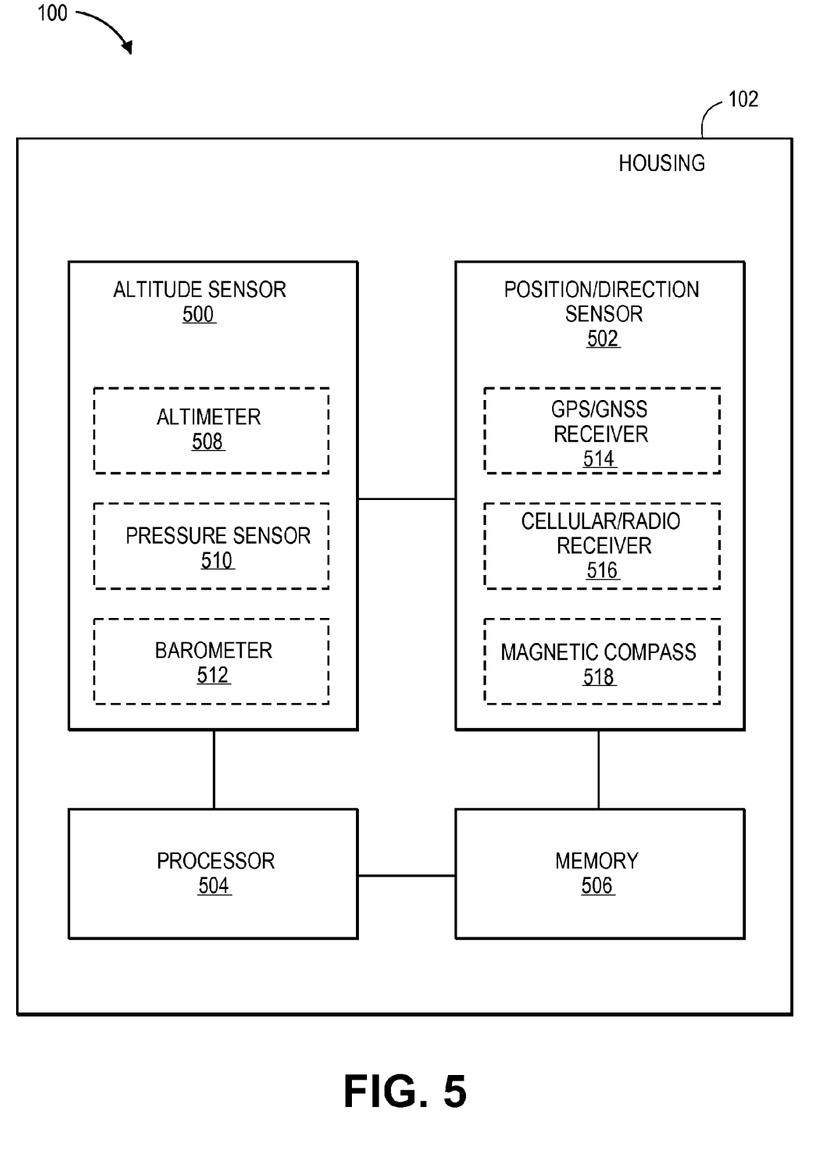
FIG. 5 is an example schematic diagram of a wearable electronic device in accordance with an example implementation of the present disclosure.

The wearable electronic device 100 may include one or more sensors, processing elements, and memory elements to support functionalities disclosed herein. For example, as shown in FIG. 5, the wearable electronic device 100 includes an altitude sensor 500, a position/direction sensor 502, a processor 504, and a memory 506. The altitude sensor 500 is configured to detect or sense an altitude of the wearable electronic device 100. For example, the altitude sensor 500 can include an altimeter 508, a pressure sensor 510, a barometer 512, combinations thereof, and so forth. The position/direction sensor 502 is configured to determine a position and/or direction of travel of the wearable electronic device 100. For example, the position/direction sensor 502 can include a global positioning system/global navigation satellite system (GPS/GNSS) receiver 514, a cellular/radio receiver 516, a magnetic compass, combinations thereof, and so forth. One or more of the components of the wearable electronic device 100 is powered by a power source, such as by an internal power source (e.g., a battery, piezoelectric device, etc.), an external power source, or a combination of internal and external power. Continuously utilizing the position/direction sensor to determine the position of the device (or utilizing another component of the wearable electronic device 100) can quickly consume the available power from the power source, such as from a battery supported by the housing 102. In embodiments, the wearable electronic device 100 is configured to activate and deactivate the position/direction sensor 502 based upon meeting certain conditions. For example, the wearable electronic device 100 can be configured to determine when to activate the position/direction sensor 502 based upon a measurement by the altitude sensor 500. In an implementation, the wearable electronic device 100 takes periodic pressure measurements via the altitude sensor 500 to determine if the vertical speed of the device/user is sufficient to assume the pilot has taken off from the ground in an aircraft. Upon determining that the vertical speed indicates that the wearable electronic device 100 is airborne (e.g., the determined vertical speed exceeds a predetermined threshold for flight), the wearable electronic device 100 enables or activates the position/direction sensor 502. Simultaneously, the device 100 may enable various timekeeping functionality such as a flight timer. In this manner, the wearable electronic device 100 can function as a virtual log book by automatically recording flight time, duration, position, distance, and the like, while avoiding power consumption by the position/direction sensor 502 when the wearable electronic device 100 is not in flight. Additionally, by periodically obtaining pressure measurements via the altitude sensor 500 to determine if the wearable electronic device 100 is in flight, the wearable electronic device 100 can activate the position/direction sensor 502 without the need of input from the user, which can prevent a user from accidentally forgetting to enable the position/direction sensor 502 before flight.

In embodiments, the wearable electronic device 100 includes a user interface, which is storable in memory and executable by the processor. The user interface is representative of functionality to control the display of information and data to the user of the wearable electronic device 100 via the display 104. In some implementations, the display 104 may not be integrated into the wearable electronic device 100 and may instead be connected externally using a connector, such as universal serial bus (USB), Ethernet, serial connections, and so forth. The user interface may provide functionality to allow the user to interact with one or more applications of the wearable electronic device 100 by providing inputs via the touch screen and/or the I/O devices. For example, the user interface may cause an application programming interface (API) to be generated to expose functionality to an application to configure the application for display by the display 104 or in combination with another display. In embodiments, the API may further expose functionality to configure the application to allow the user to interact with an application by providing inputs via the touch screen and/or the I/O devices. Applications may comprise software, which is storable in memory and executable by the processor, to perform a specific operation or group of operations to furnish functionality to the wearable electronic device 100. Example applications may include airport proximity determination applications, fitness applications, exercise applications, health applications, diet applications, cellular telephone applications, instant messaging applications, email applications, photograph sharing applications, calendar applications, address book applications, and so forth.

In implementations, the user interface may include a browser. The browser enables the wearable electronic device 100 to display and interact with content such as a webpage within the World Wide Web, a webpage provided by a web server in a private network, and so forth. The browser may be configured in a variety of ways. For example, the browser may be configured as an application accessed by the user interface. The browser may be a web browser suitable for use by a full resource device with substantial memory and processor resources (e.g., a smart phone, a personal digital assistant (PDA), etc.). However, in one or more implementations, the browser may be a mobile browser suitable for use by a low-resource device with limited memory and/or processing resources (e.g., a mobile telephone, a portable music device, a transportable entertainment device, etc.). Such mobile browsers typically conserve memory and processor resources, but may offer fewer browser functions than web browsers.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the wearable electronic device 100 can be wired, wireless, or some combination thereof. In the case of a software implementation, for instance, the module represents executable instructions that perform specified tasks when executed on a processor, such as the processor 504 with the wearable electronic device 100 of FIG. 5. The program code can be stored in one or more device-readable storage media, an example of which is the memory 506 associated with the wearable electronic device 100 of FIG. 5.

Example Procedures

The following discussion describes procedures that can be implemented in a wearable electronic device providing navigation functionality. The procedures can be implemented as operational flows in hardware, firmware, or software, or a combination thereof. These operational flows are shown below as a set of blocks that specify operations performed by one or more devices and are not necessarily limited to the orders shown for performing the operations by the respective blocks. In portions of the following discussion, reference can be made to the environment(s) of FIGS. 1 through 5. The features of the operational flows described below are platform-independent, meaning that the operations can be implemented on a variety of wearable electronic device platforms having a variety of processors.

Figure 6:
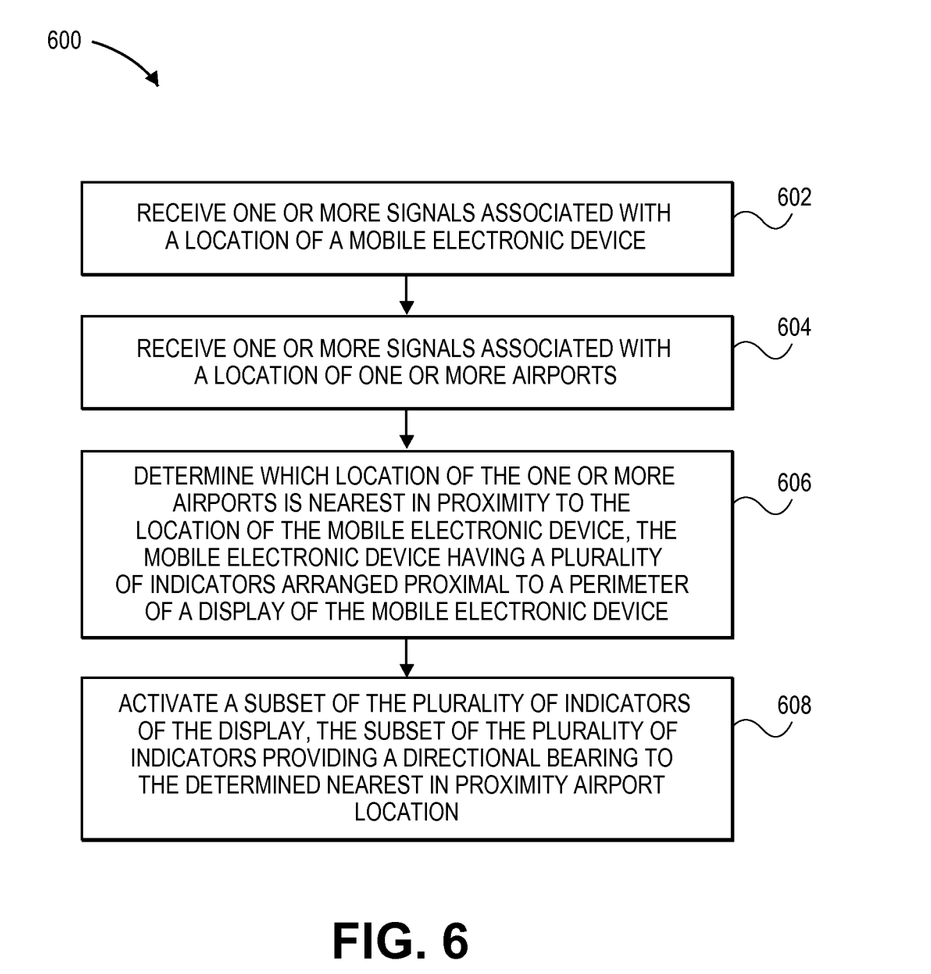
FIG. 6 is an example operational flow diagram for furnishing an illumination or activation pattern of indicators to provide directional information to a user of the device.

Referring to FIG. 6, an example operational flow diagram 600 for furnishing an illumination or activation pattern of indicators to provide directional information to a user of the device is provided. The operational flow 600 includes operations 602, 604, 606, and 608. As will be more fully apparent in light of the disclosure below, operations 602 and 604 are depicted in an example order. However, operations 602 and 604 can occur in a variety of orders other than that specifically disclosed. For example, in one implementation, operation 604 can occur before operation 602. In other implementations, operations 602 and 604 can occur substantially simultaneously. Other combinations are contemplated in light of the disclosure herein, as long as the operations are configured to receive location data for the wearable electronic device 100 and one or more airports.

Operational flow 600 at operation 602, which includes receiving one or more signals associated with a location of a wearable electronic device. For example, the location determining component 142 of the wearable electronic device 100 may receive the one or more signals pertaining to a location of the device, which may be received by the antenna 111. In an implementation, the wearable electronic device 100 may receive the one or more signals pertaining to a location of the device via the position/direction sensor 502 (e.g., as a GPS/GNSS receiver 514, a cellular/radio receiver 516, a magnetic compass 518, or combinations thereof).

From operation 602, operational flow 600 can continue to operation 604, which includes receiving one or more signals associated with a location of one or more airports, waypoints, navigational aids (navaids), points of interest (POIs), and/or other locations. The one or more signals associated with a location of one or more airports or other waypoints may be received from one or more sources external to the wearable electronic device. For example, the location determining component 142 of the wearable electronic device 100 may receive the one or more signals pertaining to a location of nearby airports, which may be received by the antenna 111. The one or more signals associated with a location of one or more airports or other waypoints may reside internally. For example, in an implementation, the locations of airports are stored in memory, such as memory 506, which is accessed by the processor 504. Thus, device 100 may be equipped with a database of airport locations including the name and location of various airports. As described above, the database may also include location information for other waypoints, such as non-directional beacons (NDB), VHF Omnidirectional (VOR) beacons, RNAV/GPS waypoints for approach, en route, and departure operations, user-specified locations, combinations thereof, and the like.

From operation 604, operational flow 600 can continue to operation 606, which includes determining which location of the one or more airports (or other waypoints) is nearest in proximity to the location of the wearable electronic device. For example, the processor 504 can compare data associated with the location of the wearable electronic device 100 with data associated with the locations of airports to determine which airport is nearest in proximity to the wearable electronic device 100. Or, instead of determining the nearest airport, device 100 may determine the nearest waypoint, navaid, VOR beacon, or the like as selected by the user. As described herein, the wearable electronic device 100 can include a plurality of indicators 300 arranged proximal to a perimeter of a display of the wearable electronic device to provide positional data to a user. Such positional data can include, for example, a directional bearing.

From operation 606, operational flow 600 can continue to operation 608, which includes activating a subset of the plurality of indicators of the display, where the subset of the plurality of indicators provides a directional bearing to the determined nearest in proximity airport location or other waypoint. For example, the display 104 can activate the subset 302 of the plurality of indicators 300 at the perimeter of display 104 to provide the directional bearing to the determined nearest airport. Additionally or alternatively, the directional bearing may indicate the nearest navaid or other waypoint selected by the user. Further, in some configurations, a first subset 302 of the indicators may provide the directional bearing to the nearest airport while a second subset of the indicators 300 simultaneously provides a directional bearing to a different waypoint (e.g., a VOR beacon, etc.)

CONCLUSION

Although techniques have been described in language specific to structural features and/or methodological acts, it is to be understood that the appended claims are not necessarily limited to the specific features or acts described. Rather, the specific features and acts are disclosed as example forms of implementing the claimed devices and techniques.

What is claimed is:

1. A wearable electronic device comprising:
   a global positioning system (GPS) receiver operable to determine a current geographic location of the wearable electronic device;
   a display device having a screen, the screen configured to display at least one indicator arranged proximal to a perimeter of the screen;
   a memory operable to store one or more modules and a database of airport locations; and
   a processor coupled with the position sensor, the display device, and the memory, the processor operable to execute the one or more modules to:
   access the database of airport locations to determine an airport nearest to the current geographic location of the wearable electronic device;
   determine a directional bearing to the nearest airport; and
   control the indicator to present the directional bearing to the nearest airport;
   wherein the indicator provides an indication of chronological seconds in a timekeeping mode and provides the directional bearing in a navigation mode.

2. The wearable electronic device as recited in claim 1, further comprising an altitude sensor configured to determine an altitude of the wearable electronic device.

3. The wearable electronic device as recited in claim 2, wherein the processor is further operable to execute the one or more modules to cause the altitude sensor to take periodic pressure measurements and to use the periodic pressure measurements to determine a vertical speed of the wearable electronic device.

4. The wearable electronic device as recited in claim 1, wherein the processor is further operable to execute the one or more modules to initiate operation of the GPS receiver when the determined vertical speed exceeds a threshold for flight.

5. The wearable electronic device as recited in claim 1, wherein the processor is operable to repeatedly compute the directional bearing to the nearest airport such that the indicator continuously provides the directional bearing to the nearest airport as the wearable electronic device changes position.

6. An wearable electronic device comprising:
- a display device having a screen, the screen configured to display a plurality of indicators arranged proximal to a perimeter of the screen;
- a global positioning system (GPS) receiver operable to determine a current geographic location of the wearable electronic device;
- a memory operable to store one or more modules and a database of airport locations; and
- a processor coupled with the GPS receiver, the display device, and the memory, the processor operable to execute the one or more modules to:
  - access the database of airport locations to determine an airport nearest to the current geographic location of the wearable electronic device;
  - determine a directional bearing to the nearest airport; and
  - activate a subset of the plurality of indicators of the screen, the subset of the plurality of indicators providing the directional bearing to the nearest airport; and
  - repeatedly determine the directional bearing to the nearest airport such that the indicator continuously provides the directional bearing to the nearest airport as the wearable electronic device changes position;
- wherein the plurality of indicators provides an indication of chronological seconds in a timekeeping mode and the directional bearing to the nearest airport in a navigation mode.

7. The wearable electronic device as recited in claim 6, further comprising an altitude sensor configured to determine an altitude of the wearable electronic device.

8. The wearable electronic device as recited in claim 7, wherein the altitude sensor includes at least one of an altimeter, a pressure sensor, or a barometer.

9. The wearable electronic device as recited in claim 7, wherein the processor is further operable to execute the one or more modules to cause the altitude sensor to take periodic pressure measurements and to use the periodic pressure measurements to determine a vertical speed of the wearable electronic device.

10. The wearable electronic device as recited in claim 9, wherein the processor is further operable to execute the one or more modules to initiate operation of the GPS receiver when the determined vertical speed exceeds a threshold for flight.

11. The wearable electronic device as recited in claim 6, wherein the device is a wrist watch.

12. The wearable electronic device as recited in claim 6, further including a user input operable to be functioned by a user to select a waypoint, wherein the processor is operable to determine a directional bearing to the selected waypoint and activate a subset of the plurality of indicators of the screen to provide a directional bearing to the selected waypoint.

13. The wearable electronic device as recited in claim 12, wherein the processor is operable to control the indicators to provide the direction bearing to the selected waypoint to replace the directional bearing to the nearest airport.

14. The wearable electronic device as recited in claim 12, wherein the processor is configured to control the screen to present a horizontal situation indicator (HSI) including a course deviation indicator for the nearest airport or selected waypoint.

15. The wearable electronic device as recited in claim 6, wherein the processor is configured to control the screen to present an altitude page display, a compass page display, and an instrument page display,
wherein the activated indicators are presented on each of the altitude page, compass page, and instrument page displays to continuously provide the directional bearing to the nearest airport.

16. An wearable electronic device comprising:
- a user input operable to be functioned by a user to select a timekeeping mode and a navigation mode;
- a display device having a screen, the screen configured to display a plurality of indicators arranged proximal to a perimeter of the screen;
- a global positioning system (GPS) receiver operable to determine a current geographic location of the wearable electronic device;
- a memory operable to store one or more modules and a database of airport locations; and
- a processor coupled with the user input, the GPS receiver, the display device, and the memory, the processor operable to execute the one or more modules to:
  - provide the timekeeping mode and activate a subset of the plurality of indicators of the screen to indicate chronological seconds; and
  - provide the navigation mode and:
    - access the database of airport locations to determine an airport nearest to the current geographic location of the wearable electronic device;
    - determine a directional bearing to the nearest airport; and
    - activate a subset of the plurality of indicators of the screen, the subset of the plurality of indicators providing the directional bearing to the nearest airport; and
    - repeatedly determine the directional bearing to the nearest airport such that the indicator continuously provides the directional bearing to the nearest airport as the wearable electronic device changes position.

17. The wearable electronic device of claim 16, wherein the user input includes one or more control buttons operable to be depressed to select between the timekeeping mode and the navigation mode.

18. The wearable electronic device as recited in claim 16, wherein during navigation mode the processor is configured to control the screen to present an altitude page display, a compass page display, and an instrument page display,
wherein the activated indicators are presented on each of the altitude page, compass page, and instrument page displays to continuously provide the directional bearing to the nearest airport.

* * * * *